Feb. 2, 1965          R. W. ANDERSON          3,168,087
                      WAFERING MACHINE
Filed May 14, 1962                          2 Sheets-Sheet 1
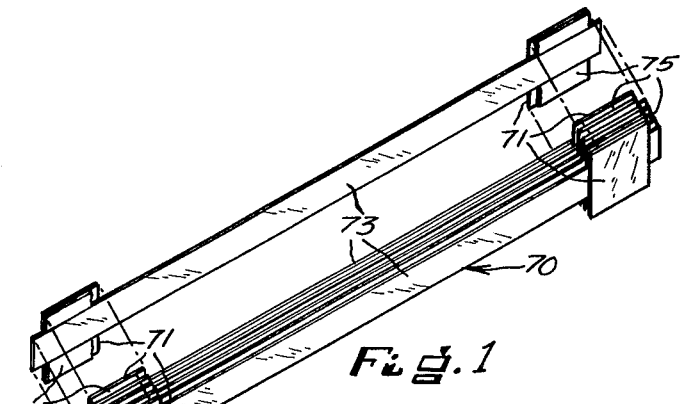
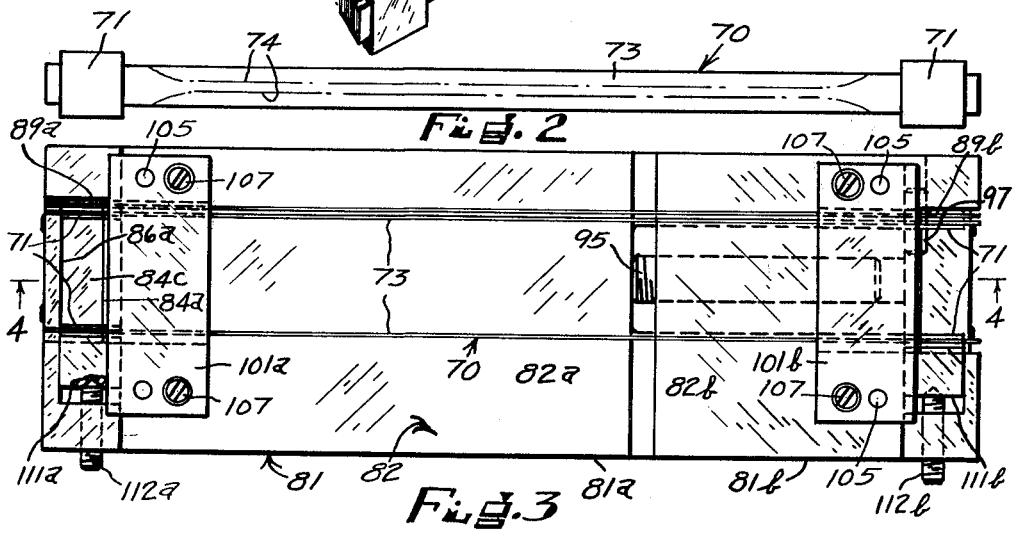
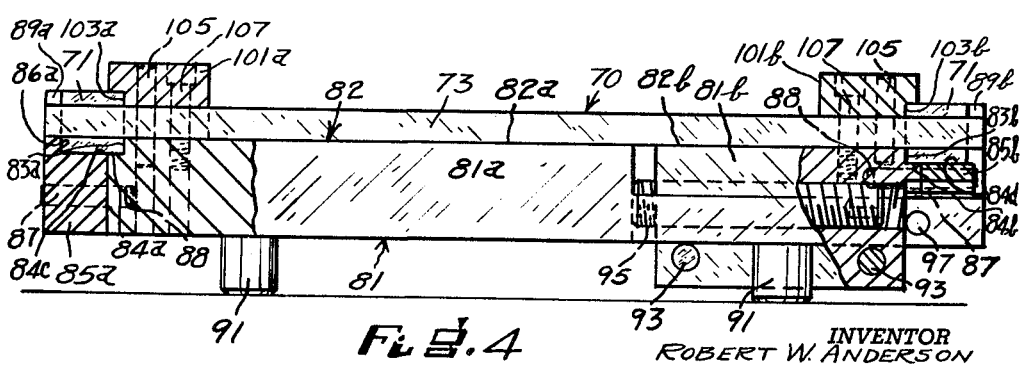
INVENTOR
ROBERT W. ANDERSON
BY *Lewis M. Smith, Jr.*
ATTORNEY

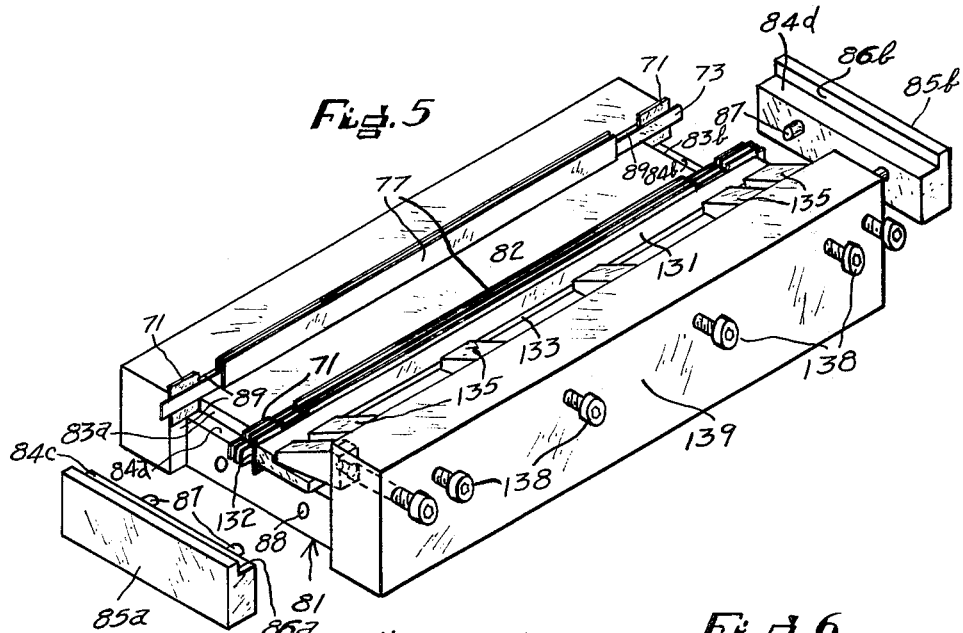
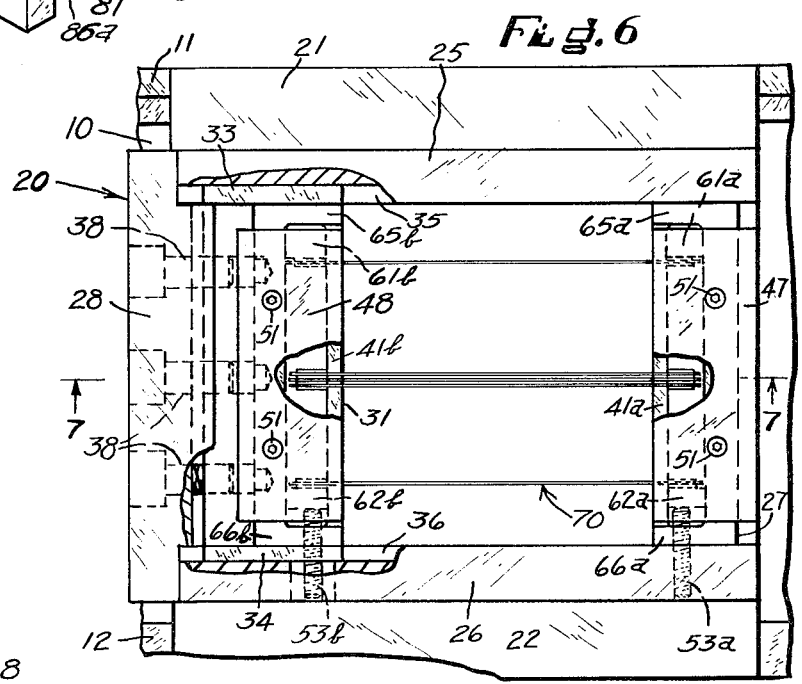
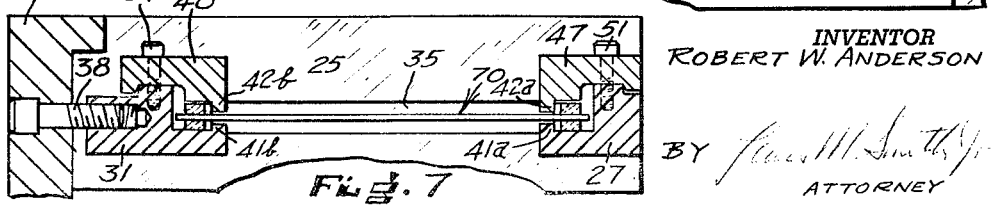

3,168,087
WAFERING MACHINE
Robert W. Anderson, Holden, Mass., assignor to Norton Company, Worcester, Mass., a corporation of Massachusetts
Filed May 14, 1962, Ser. No. 194,356
14 Claims. (Cl. 125—16)

The instant invention relates to improvements in wafering machines for cutting hard materials such as quartz, silicon, germanium and the like, and more particularly to improvements in the blade head assembly for such wafering machines including the provision of an integrated blade package including multiple blades adhered to intervening spacers.

While there are various types of wafering machines for cutting hard materials including machines arranged to be provided with a diamond wheel with a peripheral cutting edge and machines arranged to be provided with an annular diamond blade with an internal cutting edge, this application relates particularly to the type of wafering machine which may be described as a multiple blade power hacksaw, characterized by a reciprocating blade head assembly supporting a large number of closely spaced parallel blades.

In one embodiment described and illustrated in copending application Serial No. 70,997, now Patent No. 3,079,908 granted March 5, 1963 of Grover C. Hunt, the last named type of wafering machine comprises a base supporting a spaced pair of ways generally disposed in a horizontal plane and arranged to slidably support a blade head assembly for reciprocation by a suitable drive motor. This blade head assembly consists of a generally rectangular frame connected to and supported by members shaped and disposed for engagement with the spaced parallel ways mounted on the base of the machine and in turn is arranged to support and tension a large plurality of closely spaced parallel blades comprising elongated sections of thin strip material and disposed in a horizontal plane for reciprocation in engagement with an ingot of hard material forced upwardly against the blades by suitable biasing means such as a lever pivotally mounted intermediate its ends for rotation about a horizontal axis and arranged to support the hard material to be cut at one end thereof and an adjustable weight at the other end thereof.

The instant invention contemplates improvements in the blade head assembly of wafering machines of the type which may be described as multiple blade power hacksaws which derive from the incorporation in the blade head assembly of an integrated multiple blade package, and further contemplates various methods of fabricating such multiple blade packages to close dimensional tolerances.

An object of this invention is the provision of a blade head assembly for a wafering machine characterized by provision for the rapid installation of a large multiplicity of blades therein in a precisely controlled spaced parallel relationship.

Another object of this invention is to provide an integrated blade package for quick and convenient installation in the blade head assembly of a wafering machine consisting of a large multiplicity of elongated blades respectively bonded to spaced pairs of spacer elements so that they are maintained in the desired spaced parallel relationship.

A further object of this invention is the provision of methods for manufacturing an integral blade package for the blade head assembly of a wafering machine so that the blade package will conform to the required critical tolerances when it is installed in a blade head assembly.

Still another object is the provision of a method for fabricating a blade package for the blade head assembly of a wafering machine including subjecting two groups of spacer elements to relative displacement with the respective ends of interfitted elongated blades in frictional engagement therewith in order to insure that the respective blades are disposed in the required spaced parallel relationship during fabrication of the blade package.

A final object is the provision of a method for fabricating a blade package for the blade head assembly of a wafering machine including the introduction of elongated intermediate spacers temporarily between adjacent blades in order to maintain these blades in the desired spaced parallel relationship while the blade package is being fabricated.

Other objects and advantages of the instant invention will be apparent from consideration of the following description in relation to the showing in the accompanying drawings wherein:

FIG. 1 is a three dimensional view of a representative blade package fabricated according to the teachings of the instant invention, FIG. 2 is a side elevation of a reversible blade package fabricated according to the teachings of the instant invention indicating in dot-dash lines the manner in which the respective working edges of each blade are worn in use in the blade head assembly of a wafering machine, FIG. 3 is a plan view of the preferred embodiment of a jig assembly suitable for the fabrication of the integral blade package illustrated in FIG. 1, FIG. 4 is a side elevation of the jig assembly shown in FIG. 3, sectioned substantially on line 4—4 of FIG. 3, FIG. 5 is a three dimensional exploded view of an alternate embodiment of a jig assembly for fabricating an integrated blade package as illustrated in FIG. 1, FIG. 6 is a plan view of the blade head assembly of the instant invention, and FIG. 7 is a vertical section taken on line 7—7 of FIG. 6.

Referring now to the drawings wherein the respective numerals refer to like or corresponding parts, FIG. 6 illustrates a blade head assembly generally designated by the reference numeral 20 provided with a V-slide 21 and a flat-slide 22 respectively disposed in sliding engagement with a V-way 11 and a flat-way 12 secured to the horizontal upper surface of the base 10 of a multiple blade wafering machine. The blade head assembly 20 includes a first longitudinal frame member 25 and a second longitudinal frame member 26 to which the respective slides 21 and 22 are fixedly secured by suitable attachment means such as machine screws, not shown, in order to simplify the showing in FIG. 6. The respective longitudinal frame members 25 and 26 are interconnected at one end by a first end frame member 27 and at the other end by a second end frame member 28.

A blade supporting element 31 cooperating with the first end frame member 27 to support and tension a blade package 70 is supported transversely of the blade head assembly 20 adjacent to but spaced from the second end frame member 28. The supporting element 31 may be supported in sliding relation to the longitudinal frame members 25 and 26 by guides 33 and 34 projecting from the opposite ends thereof and slidable in channels 35 and 36 in the respective longitudinal frame members 25 and 26. With a blade package 70 supported in the blade head assembly 20 in the manner described in detail further below, the supporting element 31 is adjustably positioned in relation to the second end frame 28 by suitable connecting means such as one or more machine screws 38 seated and rotatable within suitable recesses in the second end frame member 28 and threadably engaged with the supporting element 31. As illustrated in FIG. 6, the blade head assembly includes three screws 38 supported by the end frame member 28 and threadably engaging the supporting element 31.

The means for supporting a blade package in the blade head assembly 20 as illustrated in FIGS. 6 and 7, includes first and second pairs of jaws and first and second pairs of clamp members operatively engaging the respective ends of a blade package 70. The first pair of jaws consists of a lower jaw 41a which may be formed integrally with the first end frame member 27 and an upper jaw 42a which may be formed integrally with a first cap member 47 which is releasably secured to the first end frame member 27 by a plurality of cap screws 51 as shown best in FIG. 7. The second pair of jaws consists of a lower jaw 41b which may be formed integrally with the supporting element 31 and an upper jaw 42b which may be formed integrally with a second cap member 48 releasably secured to the supporting member 31 by a plurality of cap screws 51 as shown best in FIG. 7. The first pair of clamp members consists of a block 61a disposed within a channel formed between the end frame member 27 and the cap member 47 by the first pair of jaws 41a and 42a, and against the surface of a projecting side portion 65a of the end frame member 27 and a second block 62a positioned within the same channel formed by the first pair of jaws 41a and 42a by an adjusting screw 53a extending through a suitable opening in longitudinal frame member 26 and threadably engaged with the projecting side portion 66a of the end frame member 27 as shown in FIG. 6. The second pair of clamp members consists of a block 61b disposed within the channel formed between the supporting element 31 and the cap member 48 by the second pair of jaws 41b and 42b and against the projecting side portion 65b of supporting element 31 and a second block 62b positioned within the same channel formed by the second pair of jaws 41b and 42b by an adjusting screw 53b extending through an enlarged clearance hole in the longitudinal frame member 36 and threadably engaged with the projecting side portion 66b of supporting element 31 as shown in FIG. 6.

As best illustrated in FIG. 1, the integral blade package generally designated by reference numeral 70 incorporated in the blade head assembly 20 of the instant invention consists of first and second spaced parallel series of thin flat spacer elements and a multiplicity of elongated relatively narrow blades 73 of thin strip material with their respective ends disposed between and bonded to adjacent spacer elements 71 of the respective series of spacer elements by suitable means such as a thermo-setting adhesive material 75.

Noting that the working edges of the respective blades are worn away to a substantial degree in use by interaction with a work piece in the presence of an abrasive slurry, the utility of such blades is limited by the amount of wear sufficient to reduce the minimum cross section area of each blade to the critical amount sufficient to withstand the tension force exerted on each blade by the adjustment of the supporting element 31 within the blade head assembly 20. Thus, this critical minimum area is determined by the strength of the blade material, the thickness of the blade material, and the magnitude of the tension force applied to each blade. In order to achieve the most favorable distribution of the force applied to each blade as the critical minimum cross section area is approached due to wear of the working edge 74, the blades may conveniently be fabricated from stock of sufficient initial width between the respective working edges 74, as illustrated in FIG. 2, so that the blades may be worn first a predetermined amount on one side along a first working edge and then substantially the same predetermined amount on the other side along a second working edge by reversing the blade package in the blade head assembly so that a symmetrical configuration of each blade is approached as the safe minimum cross section area limiting blade use is approached.

While this invention contemplates the use of a single blade package 70 in the blade head assembly in its broadest embodiment, the blade package 70 may conveniently be replaced with two or more segmental units substantially as shown in FIG. 1, but arrayed side by side in a blade head assembly of sufficient width to support two or more blade package segmental units. In this embodiment of the instant invention, one pair of spacers 71 may be omitted on one side of each blade package segmental unit so that a single pair of spacers will be interposed between the outermost blades 73 of adjoining segmental units.

In assembling an integral blade package or the respective segmental units of a blade package, it is important that each integral assembly be fabricated under conditions fully compatible with the critical conditions under which multiple blades must be installed in a blade head assembly 20 including the requirement that the facing edges of the respective series of spacer elements 71 must fall in spaced parallel planes perpendicular to the respective blades 73, the requirement that equal lengths of the respective blades 73 be exposed between the facing edges of the respective series of the spacer elements 71, and the requirement that the respective pairs of spacer elements 71 and the interfitted blades 73 be disposed in spaced parallel planes all perpendicular to the spaced parallel planes including the facing edges of the respective series of spacer elements 71 and to spaced parallel planes intersecting the respective working edges 74 of the multiple blades 73. All these requirements can be met by assembling an integral blade package or segmental units thereof in a suitable jig assembly such as that illustrated in FIGS. 3 and 4 or such as that illustrated in FIG. 5.

Each of the jig assemblies illustrated is characterized by a jig body 81 having an elongated planar surface 82 terminating at its opposite ends in oppositely facing parallel shoulders 83a and 83b perpendicular thereto for engagement with the facing edges of the respective series of spacer elements 71. Relatively depressed coplanar surfaces 84a and 84b parallel to surface 82 and projecting beyond the respective shoulders 83a and 83b support the lower edges of the respective series of spacer elements 71. The respective series of spacer elements 71 are also supported during assembly by removable jig end blocks 85a and 85b which may be provided with locating and supporting pins 87 cooperating with locating holes 88 in the jig body 81. With the exception of end block 85b in the embodiment illustrated in FIGS. 3 and 4, each of these end blocks is provided with upstanding shoulders 86a and 86b adjoining relatively depressed coplanar extensions 84c and 84d of the respective surfaces 84a and 84b. The pair of spacer elements 71 at one side of the blade package are supported in the proper position in the jig by a common planar face 89 as shown in FIG. 5 or coplanar faces 89a and 89b as shown in FIG. 3 in a plane perpendicular to the surface 82 and also perpendicular to the shoulders 83a and 83b.

Referring more particularly to the jig assembly illustrated in FIGS. 3 and 4, it will be noted that the jig body 81 in this embodiment comprises a relatively fixed body portion 81a which may conveniently be supported on a plurality of legs 91 projecting from the underside thereof and a relatively movable body portion 81b mounted for sliding movement longitudinally of the body portion 81a and constrained by suitable means such as pins 93 so that its upper surface 82b is maintained coplanar with the upper surface 82a of body portion 81a. A positioning screw 95 threadably engaging body portion 81b with one end thereof bearing against body portion 81a may be rotated to move body portion 81b lengthwise of body portion 81a into engagement with a suitable stop such as stop pin 97 projecting from body portion 81a. The jig assembly illustrated in FIGS. 3 and 4 also includes a positioning block 101a provided with a shoulder 103a located coplanar with the shoulder 83a by locating pins 105 and secured by cap screws 107 threadably engaging the jig body portion 81a, and a positioning block 101b with a shoulder 103b located coplanar with shoulder 83b by locating pins 105 and secured by cap screws 107 threadably engaging the body portion 81b. Thus, the shoulders 83a, 103a and 83b, 103b correspond to the coplanar inner surfaces of the jaws 41a, 42a and 41b, 42b of the blade head assembly 20.

The embodiment of the jig assembly illustrated in FIGS. 3 and 4 is also provided with a pair of transverse clamping means corresponding to the first and second pairs of clamp members incorporated in the blade head assembly 20 consisting of clamp blocks 111a and 111b respectively slidably supported upon body portion 81a and upon body portion 81b so that they may be advanced toward the respective faces 89a and 89b by positioning screws 112a and 112b respectively threadably engaging the body portions 81a and 81b as illustrated in FIG. 3.

Referring more particularly to the jig assembly illustrated in FIG. 5, it will be noted that substantially elongated temporary spacer elements 77 of the same thickness as the pairs of spacer elements 71 are inserted in the jig assembly on each side of each blade 73 and thus between and in line with respective pairs of spacer elements 71, in lieu of the relatively movable body portion 81b and the positioning screw 95 therefor provided in the embodiment of the jig assembly illustrated in FIGS. 3 and 4.

In the embodiment of the jig assembly illustrated in FIG. 5, the transverse clamping means corresponding to the pairs of members provided in the blade head assembly 20 consists of an elongated clamping member 131 slidably supported upon the surface 82 of the jig body 81 and having a working face 132 disposed in a plane parallel to the plane of face 89 for coaction therewith. The elongated clamping member 131 is provided with a longitudinally extending shoulder 133 engaged by the outermost edges of a plurality of clamping blocks 135 respectively secured in bearing engagement with the elongated clamping member 131 by a corresponding plurality of positioning screws 138 threadably engaged in an upstanding shoulder portion 139 formed integrally with or fixedly secured to the jig body 81.

In order to assemble a blade package as illustrated in FIG. 1 in the jig assembly illustrated in FIGS. 3 and 4, the positioning screw 95 is rotated to that the jig body portion 81b may be moved all the way to the left as seen in FIGS. 3 and 4 into engagement with the facing surface of the body portion 81a. The end blocks 85a and 85b are installed as shown by inserting the pins 81 in the cooperating holes 88 and the positioning blocks 101a and 101b are removed after the cap screws 107 are disengaged from the respective body portions 81a and 81b. After the positioning screws 112a and 112b have been rotated to permit full retraction of the clamp blocks 111a and 111b, pairs of spacer elements 71 and the blades 73 are stacked alternately in the jig assembly as indicated in FIG. 3 preferably starting with a pair of spacer elements disposed against the faces 89a and 89b. When a complete set of spacer elements 71 and blades 73 has been placed in the jig assembly, omitting the last pair of spacer elements 71 outside the last blade 73 in the case of a segmental unit of a blade assembly, the positioning screws 112a nd 112b are rotated to advance the clamping blocks 111a and 111b into light clamping engagement with the assembled blades and spacer elements.

The positioning blocks 101a and 101b are mounted on the body portions 81a and 81b, respectively, as shown in FIGS. 3 and 4 and secured thereto by cap screws 107. The positioning screw 95 is then rotated to displace the body portion 81b relative to the body portion 81a until the body portion 81b engages the stop pin 97 projecting from the body portion 81a. Next, the respective positioning screws 112a and 112b are further rotated to clamp the respective series of spacer elements 71 and the intervening ends of the respective blades 73 tightly between clamp block 111a and face 89a and between clamp block 111b and face 89b.

The relative displacement of the respective body portions 81a and 81b with the blades and spacer elements lightly clamped results in relative displacement of the respective blades 73 and the spacer elements 71 by the respective pairs of shoulders 83a, 103a and 83b, 103b, under the constraint imposed by sliding friction between adjacent parts. This procedure assures that all of the spacer elements 71 of one series will be disposed in engagement with the shoulders 83a and 103a and that all of the spacer elements of the other series will be disposed in engagement with the shoulders 83b and 103b. This procedure further assures that the blades 73 will be drawn into the precise spaced parallel relationship required for uniform tensioning of the respective blades in a blade head assembly by positioning all of the blades so that the portions thereof extending between the respective series of spacers are equal.

The procedure for the assembly of a blade package as shown in FIG. 1 in the jig assembly illustrated in FIG. 5 is similar to that described above in connection with the jig assembly shown in FIGS. 3 and 4. The end blocks 85a and 85b are mounted on the jig body 81 by inserting the pins 87 in the cooperating holes 88. A spacer element 71 is placed in the channel formed by the shoulder 83a and a shoulder 85 so that it is disposed in engagement with one end of the face 89 and a spacer element 71 is placed in the channel formed by the shoulder 83b and a shoulder 85 so that it is disposed in engagement with the other end of the face 89. A temporary elongated spacer 77 is placed upon the surface 82 in engagement with the face 89 substantially midway between the respective spacer elements 71 referred to above. A blade 73 is placed upon the surface 82 in engagement with the respective spacer elements 71 and the spacer element 77 referred to above. This sequence of steps is repeated until a blade package of the desired width is asesmbled in the jig assembly, and the package is completed by adding a final pair of spacer elements 71 and a final spacer element 77 outside the last blade 73, except in the case of a segmental unit of a blade package when this last set of spacer elements is preferably omitted.

The elongated clamping member 131 is placed upon the surface 82 of the jig body 81 with its face 132 in engagement wtih the assembled blade package as shown in FIG. 5 and the clamping blocks 135 coacting therewith are inserted between the shoulder 133 of the clamping member 131 and the respective positioning screws 138. The end-most positioning screws 138 are rotated within the shoulder portion 139 to lightly clamp the respective series of spacer elements 71 and the respective ends of the blades 73 interposed therebetween. The intermediate positioning screws 138 are also rotated in the shoulder portion 139 to force the corresponding clamping blocks 135 into engagement with the intermediate portion of the clamping member 131 in order to maintain the face 132 of the clamping member 131 parallel to the face 89 of the jig body 81 and thereby to position the respective blades 73 between the temporary spacer elements 77 so that corresponding surfaces thereof coincide with spaced parallel planes perpendicular to the planar surface 82.

After all of the spacer elements 71 have been checked to be sure that the adjacent edges of all of the spacer elements 71 of one series are in engagement with the shoulder 83a and that all of the adjacent edges of the spacer elements 71 of the other series are in engagement with the shoulder 83b, the assembly blade package is clamped tightly between the base 89 and the elongated clamping member 131 by further rotation of the respective positioning screws 138 with the respective blades 73 all seated firmly on surface 82 and with all of the spacer elements 71 seated firmly on the respective surfaces 84.

Noting that the spacer elements 71 for a given integral blade package may have a uniform thickness for each of from .012" to .024" and that spacer elements of a uniform thickness as low as .007" or less may be used in certain applications, and further that blades 73 may be used in a given blade package of a uniform thickness commonly .004" to .008" and down to a thickness of .002" or less for certain application, it will be evident that the bonding agent applied must be carefully selected so that it will flow readily into the relatively limited spaces between adjacent blades and into the even more limited spaces between adjacent spacer elements. In addition, the bonding agent must demonstrate good wetting properties when applied to the metallic surfaces of the blades and spacer elements. Moreover, the bonding agent must consist of a material which does not shrink as it sets up. Finally, the bonding agent selected must be suitable for application at a temperature below that which will adversely affect the heat treatment of the blades. Since there are several bonding agents commercially available which meet these requirements, it is deemed sufficient to describe the application of one such bonding agent below.

In the preferred embodiment of the blade package 70 characterizing the instant invention, the respective blades 73 and spacer elements 71 of the blade package are bonded together by the application thereto of a suitable thermo-setting adhesive material 75 such as the epoxy composition available commercially under the name of TYGOWELD PB-1 cement.

In order to achieve an effective bond by means of such an adhesive, the end blocks 85a and 85b are removed from the jig assembly with the parts of a blade package clamped tightly therein as described above. The jig assembly and the parts of a blade package supported thereby are heated in an oven to a suitable predetermined temperature, for example 350° F. when the adhesive used is TYGOWELD PB-1 cement. After the entire jig assembly and the blade package supported thereby have reached the desired predetermined temperature, the jig assembly is removed from the oven and the thermo-setting adhesive 75 is applied to the spacer elements 71 and to the projecting end portions of the blades 73 at each end of the blade package, so that the adhesive penetrates all of the spaces between adjacent parts of the blade package to secure each end of each blade to the adjoining spacer elements. After the adhesive 75 has been applied to both ends of the blade package clamped in a jig assembly, the jig assembly is returned to an oven held at a predetermined temperature, for example 350° F. in the case of TYGOWELD PB-1 cement, for a period sufficient to cure the adhesive 75.

When the thermo-setting adhesive 75 has been cured, the jig assembly is removed from the oven and cooled before the finished blade package 70 is removed from the jig assembly. When the jig assembly used is constructed according to FIG. 5, the temporary elongated spacer elements 77 may then be stripped from between the respective blades 73.

When the adhesive used for bonding the respective elements of an integral blade package is not characterized by thermo-setting properties, the heating cycle following the application of the adhesive may be omitted. However, preheating of the jig assembly and the blade package parts supported thereby to a relatively low temperature above room temperature still may be desirable as a means of facilitating the flow of adhesive into the very limited spaces between adjacent blades and between adjacent spacer elements.

The use of integral blade packages fabricated in the manner described above greatly facilitates the proper installation of a large multiplicity of elongated blades in the blade head assembly of a multiple blade power hacksaw with the added advantage that the proper precise alignment of all of the blades 73 is assured by the fact that the integral blade package is fabricated under conditions which assure the precise orientation of all the respective blades and which are compatible with the conditions imposed on the blades when they are installed in a blade head assembly.

From inspection of the showing in FIG. 7, it will be evident that the use of an integral blade package 70 in the blade head assembly 20 of a multiple blade wafering machine further facilitates the proper precise alignment of all the blades 73 by virtue of the fact that the pairs of jaws 41a, 42a and 41b, 42b arranged to coact with an integrated blade package rather than individual blades and spacer elements may be relieved along their opposing faces as shown in FIG. 7 so that neither one of these faces engages the edges of the blades. Thus the orientation of the respective blades depends entirely upon the intervening spacer elements and is not affected by any direct interaction between the pairs of jaws and the blades.

The use of an integral blade package in the blade head assembly as a means of assuring the proper precise alignment of all the blades is particularly effective with respect to the vertical alignment of the blades in the horizontally disposed blade head assembly so that all of the blades are supported perpendicular to the plane of the respective working edges 74 of the multiple blades, within extremely close tolerances of the order of ten minutes of arc or less from true vertical. This extremely precise vertical alignment of the respective blades in turn makes it possible to substantially increase the width of the blades between the respective edges 74 thereof so that the tension force applied to each blade may be increased and/or so that the thickness of the blades may be further reduced to reduce the width of the kerf and thereby reduce the amount of material wasted as a result of the wafering operation.

The use of blade packages according to the teachings of the instant invention characterized by the precise vertical alignment of the blades within extremely close tolerances offers the additional advantages inherent in reversing the blades for wear in the manner indicated in FIG. 2. In a blade package characterized by blades 73 of substantially increased width between the respective working edges 74, the amount of blade wear which can be tolerated in relation to the minimum necessary blade cross section area is substantially increased. In addition, the reversal of such blades mid-way of their useful life provides for equalized wear of the respective blades along the opposite working edges 74 so that the respective blades once again approach a symmetrical configuration as illustrated in FIG. 2 as they approach their fully worn out condition.

The precision installation of properly selected multiple blades and associated spacer elements in a blade head assembly is further assured by the assembly of these blades and spacer elements in integral blade packages, because these integral blade packages may be checked readily on the commercially available optical inspection equipment commonly used for the critical inspection of precision parts.

Relatively wide blade packages including very large numbers of blades may conveniently be made up of several segmental units in the manner referred to above to good advantage for various reasons. For example, when the ingot to be sliced is substantially shorter than the maximum capacity of a particular blade head assembly, the blade head assembly may be loaded with a reduced number of segmental units sufficient to span the particular work piece being cut. In addition, it may be desirable to cut groups of wafers of different thicknesses from the same ingot by installing segmental units in a blade head assembly each having spacer elements of a different thickness in order to produce wafers of the desired different thicknesses simultaneously.

From consideration of the above disclosure, it will be evident that the instant invention provides an improved blade head assembly for multiple blade wafering machines characterized by the inclusion therein of an integral blade package, and further provides satisfactory methods for fabricating such an integral blade package with the requisite precision.

Since various details of this invention are subject to modification, it is to be understood that the embodiment described above and illustrated in the accompanying drawings is to be interpreted as illustrative and not in a limiting sense, and that the scope of this invention is defined by the claims appended hereto.

What is claimed is:

1. An integrated self-supporting blade package for insertion in and removal from a multiple blade wafering machine as a unit, said blade package comprising
   a plurality of flat thin spacer elements arrayed in first and second spaced parallel series,
   a multiplicity of spaced parallel elongated blades of thin flat strip material,
   each blade having one end disposed between and in engagement with adjacent spacer elements of the first series and the other end disposed between and in engagement with adjacent spacer elements of the second series so as to form reentrant spaces between adjacent spacers beyond both edges of each blade and so as to form reentrant spaces between the ends of adjacent blades, and
   a bonding agent substantially filling the respective reentrant spaces adherent to the opposing surfaces of adjacent spacer elements and to the opposing surfaces of adjacent blades.

2. An integrated self-supporting blade package for insertion in and removal from a multiple blade wafering machine as a unit, said blade package comprising
   a plurality of flat thin spacer elements arrayed in first and second spaced parallel series,
   a multiplicity of elongated blades of thin flat strip material arrayed perpendicular to and with one longitudinal edge of each blade intersecting a reference plane,
   each blade having one end disposed between and in bearing engagement with adjacent spacer elements of the first series and the other end disposed between and in bearing engagement with adjacent spacer elements of the second series,
   the spacer elements and the blades being of such relative sizes and so positioned relative to each other that the ends of the blades extend beyond each series of spacer elements to form reentrant spaces between the ends of adjacent blades and that the spacer elements extend beyond both longitudinal edges of each blade to form opposed reentrant spaces between adjacent spacer elements, and
   bonding means substantially filling the respective reentrant spaces and adherent to the opposing surfaces of adjacent spacer elements and to the opposing surfaces of adjacent blades so that said spacer elements and said blades are fixedly interconnected by said bonding means to form an integrated blade package.

3. An integrated self-supporting blade package for insertion in and removal from a multiple blade wafering machine as a unit, said blade package comprising
   a plurality of relatively wide flat thin spacer elements of equal uniform thickness arrayed in equal first and second spaced parallel series,
   a multiplicity of relatively narrow elongated blades of thin flat strip material of constant thickness arrayed perpendicular to and with one longitudinal edge of each blade intersecting a reference plane,
   each blade having one end disposed between and extending beyond adjacent spacer elements of the first series and the other end disposed between and extending beyond adjacent spacer elements of the second series so that the respective opposite edges of said spacer elements project laterally beyond the respective longitudinal edges of said elongated blades, and
   an adhesive bonding agent substantially filling the spaces between the ends of adjacent blades beyond the respective series of spacer elements and the spaces between adjacent spacer elements on both sides of the respective blades,
   said adhesive bonding agent being adherent to opposing surfaces of adjacent blades and to opposing surfaces of adjacent spacer elements to maintain said blades fixedly in bearing engagement with adjacent spacer elements.

4. A blade package for a multiple blade wafering machine comprising a multiplicity of spaced parallel substantially identical elongated relatively narrow blades of thin flat sheet material,
   and a plurality of pairs of substantially identical short spacer elements of thin flat sheet material relatively wider than said blades,
   each pair of spacer elements being disposed against one surface of one of said blades at the opposite ends thereof for engagement with the adjoining surface of an adjacent blade,
   the relatively wider spacer elements overhanging the relatively narrow blades on both sides thereof to form an opposed pair of reentrant spaces alongside each said blade adjacent each end thereof, and
   adhesive bonding means substantially filling the reentrant spaces and adherent to the opposing surfaces of adjoining spacer elements to secure said spacer elements and the interfitting blades in a predetermined fixed relationship.

5. A blade head assembly for a multiple blade wafering machine comprising
   a generally rectangular supporting frame,
   a first blade package engaging means disposed transversely of one end of said supporting frame including a first pair of opposed releasable clamp members,
   an adjustable supporting element disposed adjacent the other end of said supporting frame,
   a second blade package engaging means disposed transversely of said supporting frame and supported by said supporting element including a second pair of opposed releasable clamp members,
   an elongated multiple blade package secured transversely adjacent its opposite ends in said first pair of clamping members and in said second pair of clamping members respectively,
   said blade package including a plurality of flat thin spacer elements arrayed in first and second spaced parallel series, and
   a multiplicity of elongated blades of thin flat strip material,
   each with one end disposed between and bonded to adjacent spacer elements of the first series and the other end disposed between and bonded to adjacent spacer elements of the second series, and
   adjustable coupling means interconnecting said supporting frame and said supporting element and operable to displace said supporting element longitudinally relative to said supporting frame to tension the blades of said elongated multiple blade package.

6. A blade head assembly for a multiple blade wafering machine comprising
   a generally rectangular supporting frame,
   a first blade package engaging means disposed transversely of one end of said supporting frame including a first pair of opposed elongated releasable jaws and a first pair of opposed releasable clamp members disposed adjacent the opposite ends of said first pair of jaws,
   an adjustable supporting element disposed adjacent the other end of said supporting frame,
   a second blade package engaging means disposed transversely of said supporting frame and supported by said supporting element including a second pair of opposed elongated releasable jaws and a second pair of opposed releasable clamp members,
   an elongated multiple blade package engaged adjacent its opposite ends by said first pair of jaws and by said second pair of jaws respectively and clamped transversely adjacent its opposite ends by said first pair of clamping members and by said second pair of clamping members, respectively, said blade package including a plurality of flat thin relatively wide spacer elements arrayed in first and second spaced parallel series, and a multiplicity of relatively narrow elongated blades of thin flat strip material, each with one end disposed between and bonded to adjacent spacer elements of the first series and the other end disposed between and bonded to adjacent spacer elements of the second series with the respective spacer elements projecting beyond both edges of the adjacent blades for engagement by said jaws, and adjustable coupling means interconnecting said supporting frame and said supporting element and operable to displace said supporting element longitudinally relative to said supporting frame to tension the blades of said elongated multiple blade package.

7. A method of fabricating an integrated multiple blade package for multiple blade wafering machines comprising assembling a multiplicity of elongated blades in a jig in alternate interfitting relation with pairs of spacer elements interposed between the opposite ends of adjacent blades, constraining a multiplicity of elongated blades in spaced parallel relationship over substantially their entire length, clamping a multiplicity of elongated blades and interfitted pairs of spacer elements together at each end of such blades to secure the blades and spacer elements temporarily in mutual bearing engagement with the respective spacer elements overhanging both sides of each of the interfitted blades, introducing an adherent bonding means into the reentrant spaces between adjacent spacer elements to bond all of the blades and all of the spacer elements together permanently to form an integrated multiple blade package.

8. A method of fabricating an integrated multiple blade package for multiple blade wafering machines comprising assembling a multiplicity of elongated blades in a jig in alternate interfitting relation with pairs of spacer elements interposed between the opposite ends of adjacent blades, constraining a multiplicity of elongated blades in spaced parallel relationship over substantially their entire length, clamping a multiplicity of elongated blades and interfitting pairs of spacer elements together at each end of such blades, heating a multiplicity of elongated blades and interfitting pairs of spacer elements in the jig to a predetermined temperature, applying an adhesive to the interfitting portions of the blades and spacer elements, and subjecting a multiplicity of elongated blades and interfitting pairs of spacer elements in the jig to a predetermined heating cycle to cure the adhesive.

9. A method of fabricating an integrated multiple blade package for multiple blade wafering machines comprising assembling a multiplicity of elongated blades in a jig in alternate interfitting relation with pairs of short spacer elements interposed between the opposite ends of adjacent blades and an additional plurality of elongated spacer elements interposed between intermediate portions of adjacent blades, clamping the blades and the short spacer elements together at each end of the blades, applying means to bond all of the blades and all of the short spacer elements together, and removing the elongated spacer elements from between adjacent blades to form an integrated assembly.

10. A method of fabricating an integrated multiple blade package for multiple blade wafering machines comprising assembling a multiplicity of elongated blades in a jig in alternate interfitting relation with pairs of short spacer elements interposed between the opposite ends of adjacent blades and an additional plurality of elongated spacer elements interposed between the intermediate portions of adjacent blades, clamping the blades and the short spacer elements together at each end of the blades, heating the blades and the spacer elements in the jig to a predetermined temperature, applying an adhesive to the interfittng portions of the blades and the spacer elements, subjecting the blades and the spacer elements in the jig to a predetermined heating cycle to cure the adhesive, and removing said elongated spacer elements from between adjacent blades to form an integrated assembly.

11. A method of fabricating an integrated multiple blade package for multiple blade wafering machines comprising assembling a multiplicity of elongated blades in an elongated longitudinally expandable jig in alternate interfitting relation with pairs of spacer elements interposed between the opposite ends of adjacent blades, drawing the multiplicity of blades into spaced parallel relation by expanding the jig longitudinally against a precision stop with the blades and the spacer elements lightly transversely clamped at both ends of the blades, immobilizing the blades and the spacer elements by tightly transversely clamping the blades and the spacer elements at both ends of the blades, and applying means to bond all of the blades and all of the spacer elements together to form an integrated assembly.

12. A method of fabricating an integrated multiple blade package for multiple blade wafering machines comprising assembling the multiplicity of elongated blades in an elongated longitudinally expandable jig in alternate interfitting relation with pairs of spacer elements interposed between the opposite ends of adjacent blades, drawing the multiplicity of blades into spaced parallel relation by expanding the jig longitudinally against a precision stop with the blades and the spacer elements lightly transversely clamped at both ends of the blades, immobilizing the blades and the spacer elements by tightly transversely clamping the blades and the spacer elements at both ends of the blades, heating the blades and the spacer elements in the jig to a predetermined temperature, applying an adhesive to the interfitting portions of the blades and the spacer elements, and subjecting the blades and the spacer elements in the jig to a predetermined heating cycle to cure the adhesive.

13. A blade head assembly for a multiple blade wafering machine comprising a generally rectangular supporting frame, a first blade package engaging means disposed transversely of one end of said supporting frame including a first pair of opposed elongated releasable jaws and a first pair of opposed releasable clamp members disposed adjacent the opposite ends of said first pair of jaws, an adjustable supporting element disposed adjacent the other end of said supporting frame, a second blade package engaging means disposed transversely of said supporting frame and supported by said supporting element including a second pair of opposed elongated releasable jaws and a second pair of opposed releasable clamp members disposed adjacent the opposite ends of said second pair of jaws, a plurality of elongated multiple blade packages each engaged adjacent its opposite ends by said first pair of jaws and by said second pair of jaws respectively and all clamped together transversely adjacent their opposite ends by said first pair of clamping members and by said second pair of clamping members, respectively, each said multiple blade package including a plurality of flat thin relatively wide spacer elements arrayed in first and second spaced parallel series, and a multiplicity of relatively narrow elongated blades of thin flat strip material, each with one end disposed between and bonded to adjacent spacer elements of the first series and the other end disposed between and bonded to adjacent spacer elements of the second series with the respective spacer elements projecting beyond both edges of the adjacent blades for engagement by said jaws, and adjustable coupling means interconnecting said supporting frame and said supporting element and operable to displace said supporting element longitudinally relative to said supporting frame to tension the blades of all of said elongated multiple blade packages.

14. A blade head assembly as described in claim 13, wherein each said multiple blade package includes first and second series of spacer elements each equal in number to the number of said elongated blades so that each multiple blade package ends on one side thereof with an elongated blade and on the other side thereof with spacer elements, whereby a plurality of multiple blade packages may be mounted side by side within said blade head assembly with substantially equal spacing between adjacent elongated blades across the entire plurality of multiple blade packages.

References Cited in the file of this patent

FOREIGN PATENTS

| | | |
|---|---|---|
| 106,804 | Great Britain | June 7, 1917 |
| 570,624 | Canada | Feb. 17, 1959 |